US011859793B2

(12) United States Patent
Huang et al.

(10) Patent No.: US 11,859,793 B2
(45) Date of Patent: Jan. 2, 2024

(54) DETACHABLY MOUNTED STREET LAMP (71) Applicant: HUNAN NEPUENERGY SCIENCE & TECHNOLOGY CO., LTD., Changsha (CN)

(72) Inventors: Haoyu Huang, Changsha (CN); Yibo Wang, Changsha (CN)

(73) Assignee: HUNAN NEPUENERGY SCIENCE & TECHNOLOGY CO., LTD., Changsha (CN)

( * ) Notice: Subject to any disclaimer, the term of this patent is extended or adjusted under 35 U.S.C. 154(b) by 27 days.

(21) Appl. No.: 17/632,149

(22) PCT Filed: Oct. 11, 2019

(86) PCT No.: PCT/CN2019/110592
§ 371 (c)(1),
(2) Date: Feb. 1, 2022

(87) PCT Pub. No.: WO2021/022668
PCT Pub. Date: Feb. 11, 2021

(65) Prior Publication Data
US 2022/0275917 A1 Sep. 1, 2022

(30) Foreign Application Priority Data
Aug. 8, 2019 (CN) .................. 201910729825.X (51) Int. Cl.
*F21S 9/03* (2006.01)
*F21S 8/08* (2006.01)
*F21V 19/04* (2006.01)

(52) U.S. Cl.
CPC .............. *F21S 9/035* (2013.01); *F21S 8/085* (2013.01); *F21V 19/04* (2013.01)

(58) Field of Classification Search
CPC .. F21S 9/035; F21S 8/085; F21S 8/088; F16L 21/002; F16L 25/0009
See application file for complete search history.

(56) References Cited

U.S. PATENT DOCUMENTS 6,060,658 A * 5/2000 Yoshida ................ G09F 13/02
52/173.3
8,007,124 B2 * 8/2011 Kim ..................... F21S 8/086
362/267

(Continued)

FOREIGN PATENT DOCUMENTS

CN 104251448 A 12/2014
CN 109488966 A 3/2019

(Continued)

OTHER PUBLICATIONS

International Search Report from International Application No. PCT/CN2019/110592 dated Apr. 24, 2020.

*Primary Examiner* — Alexander K Garlen
(74) *Attorney, Agent, or Firm* — Dorsey & Whitney LLP (57) ABSTRACT

An optical storage integrated lamp, comprising a lamp post, a luminaire, at least one photovoltaic panel, and an energy storage device. The lamp post comprises at least two sections of sub lamp posts, and adjacent two sections of sub lamp posts are detachably connected with each other; the luminaire is detachably mounted at the sub lamp post located at the top of the lamp post; an accommodating cavity is formed in one sub lamp post; the energy storage device is accommodated in the accommodating cavity; the at least one photovoltaic panel is provided on the outer surface of at least one sub lamp post.

10 Claims, 5 Drawing Sheets

(56) References Cited

U.S. PATENT DOCUMENTS

| | | | | |
|---|---|---|---|---|
| 10,451,233 B1* | 10/2019 | Izradel | .................... | H02S 40/38 |
| 10,763,776 B2* | 9/2020 | Bradley | ................ | H01L 31/048 |
| 2009/0040750 A1* | 2/2009 | Myer | ...................... | F21S 9/037 |
| | | | | 136/246 |
| 2011/0305010 A1* | 12/2011 | Leadford | ................ | F21S 9/035 |
| | | | | 136/246 |
| 2014/0360559 A1* | 12/2014 | Braghiroli | ............... | F21S 8/086 |
| | | | | 136/251 |
| 2014/0362564 A1* | 12/2014 | Giblett | .................... | F21S 9/035 |
| | | | | 362/183 |
| 2015/0021990 A1* | 1/2015 | Myer | ..................... | F21S 8/088 |
| | | | | 362/183 |

FOREIGN PATENT DOCUMENTS

| | | | | |
|---|---|---|---|---|
| CN | 208595498 U | 3/2019 | | |
| CN | 208919961 U | 5/2019 | | |
| EP | 2796774 A1 * | 10/2014 | ............. | F21S 8/088 |
| KR | 20130102908 A | 9/2013 | | |
| KR | 20140109755 A | 9/2014 | | |

\* cited by examiner

DETACHABLY MOUNTED STREET LAMP

TECHNICAL FIELD

The present disclosure relates to the field of lighting devices, and more particularly, to a lamp with integrated structure for lighting and energy storage.

BACKGROUND

With the development of new energy by the country, solar energy is widely used because of its permanence, environmental protection property and safety. In photovoltaic street lamps, solar energy is converted to electric energy by photovoltaic panels, and then the electric energy is used for illuminating roads. Compared with conventional street lamps, the photovoltaic street lamps have good an economic performance.

The photovoltaic street lamp generally includes a lamp, a lamp post, a photovoltaic panel, a storage battery, and the like. The lamp post is generally of an integrated structure. The lamp, the photovoltaic panel, and the storage battery are respectively mounted on different positions on the lamp post. During the transportation of the photovoltaic street lamp, components of the photovoltaic street lamp require a large footprint, resulting in a high transportation cost.

SUMMARY

In view of the above, it is necessary to provide a lamp with integrated structure for lighting and energy storage that is easy to be mounted and transported for addressing the problems of difficult mounting and transportation of conventional photovoltaic street lamps.

A lamp with integrated structure for lighting and energy storage includes a lamp post, a lamp, at least a photovoltaic panel and an energy storage device. The lamp post includes at least two sub-posts, and two adjacent sub-posts are detachably connected to each other. The lamp is detachably mounted on a sub-post on a top of the lamp post. An interior of one of the sub-posts is provided with a receiving cavity, and the energy storage device is received in the receiving cavity. The at least a photovoltaic panel is disposed on an outer surface of at least one of the sub-posts.

In the lamp with integrated structure for lighting and energy storage described above, in a transportation process, the lamp post may be disassembled into a plurality of sub-posts, the photovoltaic panel may be mounted on the outer surface of a corresponding sub-post, and the energy storage device is mounted in the receiving cavity of the sub-post, so that the footprint required by the lamp with integrated structure for lighting and energy storage in the transportation process is significantly reduced, and the transportation cost is saved.

In one of the embodiments, the lamp post further includes a first connection member, through which two adjacent sub-posts are detachably connected.

In one of the embodiments, the first connection member is provided with a first connection portion and a second connection portion, which are opposite to each other. The first connection portion is configured to cooperate with an end of one sub-post to limit the sub-post in a radial direction, and the second connection portion is configured to cooperate with an end of another adjacent sub-post to limit another adjacent sub-post in the radial direction.

In one of the embodiments, the first connection portion is provided to protrude from the first connection member, and an outer contour of the first connection portion is provided to be matched with a shape of an inner cavity of the corresponding sub-post. Alternatively, the first connection portion is provided to be recessed in the first connection member, and an inner contour of the first connection portion is provided to be matched with an outer contour of the corresponding sub-post.

In one of the embodiments, an outer diameter of the first connection portion gradually decreases from an end close to the second connection portion to an end away from the second connection portion.

In one of the embodiments, the second connection portion is provided to protrude from the first connection member, and an outer contour of the second connection portion is provided to be matched with a shape of an inner cavity of the corresponding sub-post. Alternatively, the second connection portion is provided to be recessed in the first connection member, and an inner contour of the second connection portion is provided to be matched with an outer contour of the corresponding sub-post.

In one of the embodiments, an outer diameter of the second connection portion is constant.

In one of the embodiments, the lamp with integrated structure for lighting and energy storage further includes a transparent and embossed lampshade and a light bar. The transparent and embossed lampshade and the light bar are both mounted on a side wall of the sub-post, and the light bar is mounted on an edge of the transparent and embossed lampshade.

Alternatively, the lamp with integrated structure for lighting and energy storage further includes: a lampshade formed by the combination of a light guide plate, a lamp picture and a transparent housing; and a light bar. The lampshade and the light bar are both mounted on a side wall of the sub-post, and the light bar is mounted on an edge of the lampshade.

In one of the embodiments, the energy storage device includes at least a supercapacitor module, and each supercapacitor module includes a plurality of supercapacitors connected to each other.

In one of the embodiments, the lamp with integrated structure for lighting and energy storage further includes at least one insulating accommodating box disposed in the receiving cavity. Each insulating accommodating box accommodates a corresponding supercapacitor module.

In one of the embodiments, the insulating accommodating box includes a box body having an opening on a side of the box body, and a cover body covering at the opening. The cover is further provided with an electrode lead-out end which leads out positive and negative electrodes of the supercapacitor module.

In one of the embodiments, it is provided a plurality of supercapacitor modules and a plurality of insulating accommodating boxes. The plurality of insulating accommodating boxes are provided to be stacked and connected to each other.

In one of the embodiments, the lamp with integrated structure for lighting and energy storage further includes a connection member connected between two adjacent insulating accommodating boxes. The connection member includes a plurality of screw rods and a plurality of nuts matched with the screw rods. The plurality of nuts is fixed to the cover body of the insulating accommodating box, and each screw rod extends through the plurality of insulating accommodating boxes and the corresponding nuts, so that the plurality of insulating accommodating box are stacked and connected to each other.

DETAILED DESCRIPTION OF THE EMBODIMENTS

For the convenience of understanding the present disclosure, the present disclosure is described more fully hereinafter with reference to the accompanying drawings. Preferable embodiments of the present disclosure are set forth in the accompanying drawings. However, the present disclosure may be embodied in many different forms and is not limited to the embodiments described herein. Rather, these embodiments are provided so that the understanding of the present disclosure will be more thorough and complete.

All technical and scientific terms used herein have the same meaning as commonly understood by skilled person in the art to which this disclosure belongs, unless otherwise defined. The terms used in the specification of the present disclosure herein are for the purpose of describing specific embodiments only and are not intended to limit the present disclosure. The term "and/or" used herein includes any and all combinations of one or more of the associated listed items.

In describing positional relationships, when an element is referred to as being "on" another element, it can be directly on the other element or intermediate elements may also be present, unless otherwise specified. It is also understood that when an element is referred to as being "between" two elements, it may be the only element between the two elements, or one or more intermediate layers may also be present.

In the case of using "include", "have", and "contain" described herein, unless explicitly defined terms such as "only", "consist of", etc., another component(s) may also be added. Unless mentioned to the contrary, singular terms may include plural concepts and should not be construed as having the number of one.

Furthermore, the accompanying drawings are not drawn to a 1:1 scale and the relative dimensions of elements in the accompanying drawings are drawn by way of example only and not necessarily to true scale.

Figure 1:
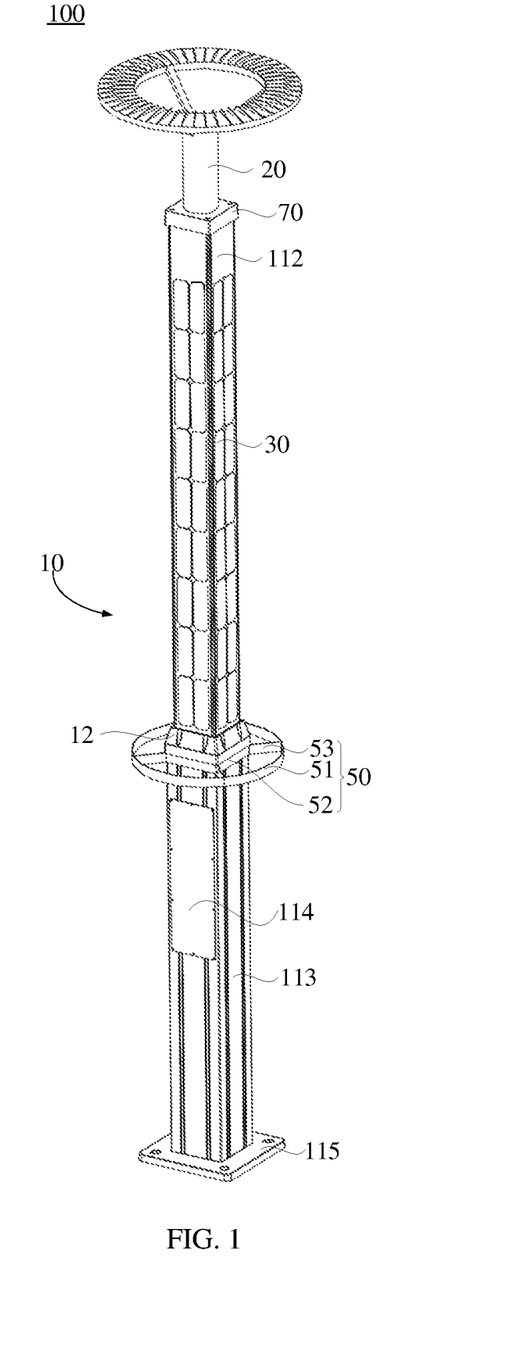
FIG. 1 is a schematic structural view of a lamp with integrated structure for lighting and energy storage in an embodiment of the present disclosure.
Figure 2:
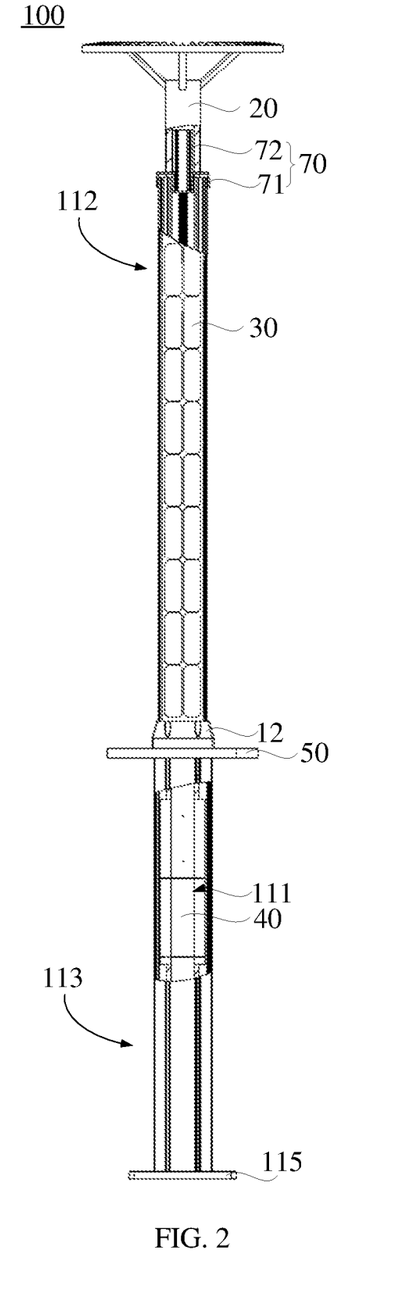
FIG. 2 is a schematic structural view of the lamp with integrated structure for lighting and energy storage shown in FIG. 1 from another viewing angle.

As shown in FIGS. 1 and 2, a lamp with integrated structure for lighting and energy storage 100 in an embodiment of the present disclosure includes a lamp post 10, a lamp 20, at least a photovoltaic panel 30 and an energy storage device 40.

The lamp post 10 includes at least two sub-posts, and two adjacent sub-posts are detachably connected to each other. The lamp 20 is detachably mounted on a sub-post on a top of the lamp post 10. An interior of one of the sub-posts is provided with a receiving cavity 111, and the energy storage device 40 is received in the receiving cavity 111. The at least a photovoltaic panel 30 is disposed on an outer surface of at least one of the sub-posts.

Therefore, in a transportation process, the lamp post 10 may be disassembled into a plurality of sub-posts, the photovoltaic panel 30 may be mounted on the outer surface of a corresponding sub-post, and the energy storage device 40 is mounted in the receiving chamber 111 of the sub-post, so that the footprint required by the lamp with integrated structure for lighting and energy storage 100 in the transportation process is significantly reduced, and the transportation cost is saved.

In addition, conventional photovoltaic panels are generally fixed on both sides of the lamp post via a bracket, and thus has a large light-receiving area and a fixed orientation. As a result, the generating capacity varies greatly with seasons, and the wind resistance is weak. The lamp with integrated structure for lighting and energy storage 100 of the present disclosure has a small windward surface because the photovoltaic panel 30 is mounted on the outer surface of the lamp post, and the photovoltaic panel 30 can be mounted around a periphery of the lamp post, so that it may effectively receive light at different times without affecting the light-receiving area.

In a conventional lamp with integrated structure for lighting and energy storage, an energy storage device is usually buried, suspended or integrated into a lamp base. However, when the energy storage device is buried, it is necessary to dig a battery well, which is cumbersome to construct, and is not conducive to maintenance and recycling; when the energy storage device is suspended, an overall appearance of the lamp with integrated structure for lighting and energy storage may be affected, and external wiring is also required; and when the energy storage device is integrated into the lamp base, it may cause the lamp to have a bloated volume, which also affects the attractive appearance. The lamp with integrated structure for lighting and energy storage 100 of the present disclosure is disposed in the lamp post 100, which is convenient to be mounted and maintained, and may not affect the attractive appearance of the lamp with integrated structure for lighting and energy storage 100.

In a specific embodiment, the lamp post 10 includes two sub-posts, which are referred to as a first sub-post 112 and a second sub-post 113, respectively, for convenience of subsequent description. Specifically, the lamp 20 is mounted on a top end of the first sub-post 112, and the second sub-post 113 has a receiving cavity 111 for receiving the energy storage device 40.

Further, both the first sub-post 112 and the second sub-post 113 have a profile structure. The profile structure is convenient to be manufactured, and parameters such as specific shape, material, heat treatment state, and mechanical properties of the profile can be selected according to design requirements. In addition, profiles are also convenient to be cut to meet the requirements of the lamp post 10 of different heights. Preferably, both the first sub-post 112 and the second sub-post 113 are square profiles that provide a reliable receiving space for the energy storage device 40 on the one hand, while the photovoltaic panel 30 can be stably mounted without bending on the other hand.

In some embodiments, the lamp post 10 further includes a first connection member 12, and two adjacent sub-posts are detachably connected through the first connection member 12.

Figure 3:
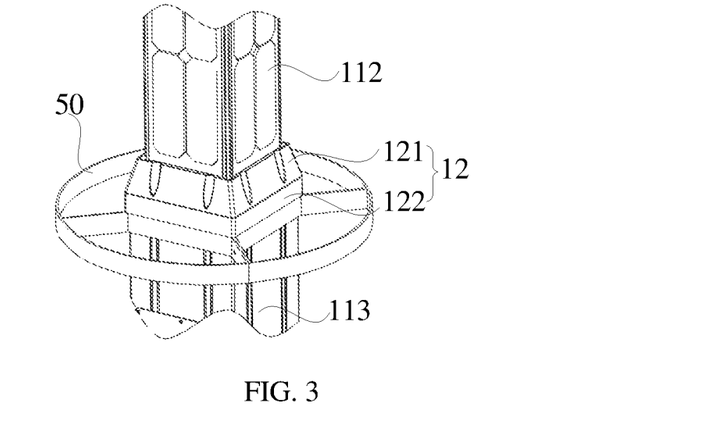
FIG. 3 is a schematic structural view of the lamp with integrated structure for lighting and energy storage shown in FIG. 1 from further another viewing angle.
Figure 4:
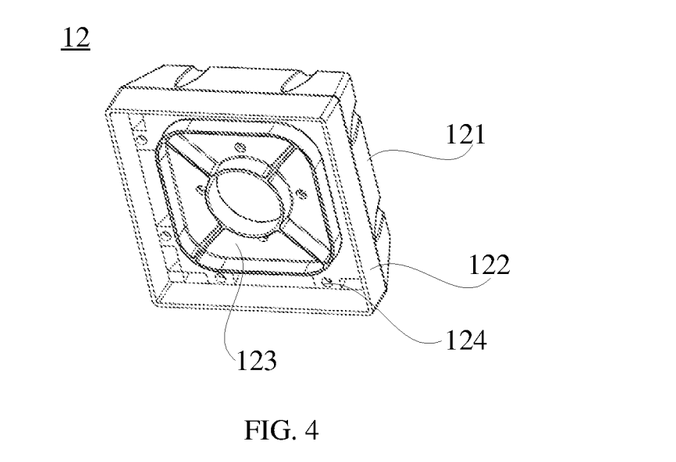
FIG. 4 is a schematic structural view of a first connection member of the lamp with integrated structure for lighting and energy storage shown in FIG. 1.

Further, as shown in FIGS. 3 and 4, the first sub-post 112 and the second sub-post 113 are detachably connected through the first connection member 12. The first connection member 12 is provided with a first connection portion 121 and a second connection portion 122, which are opposite to each other. The first connection portion 121 is configured to cooperate with an end of the first sub-post 112 to limit the first sub-post 112 in a radial direction, and the second connection portion 122 is configured to cooperate with an end of the second sub-post 113 to limit the second sub-post 133 in the radial direction. In this way, the first sub-post 112 and the second sub-post 113 can be firmly connected by the first connection member 12, preventing an unstable connection at the connection position caused by the first sub-post 112 and the second sub-post 113 being too long or too thin.

In a preferred embodiment, the first connection portion 121 is provided to be recessed in the first connection member 12, and an inner contour of the first connection portion 121 is provided to be matched with an outer contour of the first sub-post 112. The second connection portion 113 is provided to be recessed in the first connection member 12, and an inner contour of the second connection portion 122 is provided to be matched with an outer contour of the second sub-post 113. In other embodiments, the first connection portion 121 is provided to protrude from the first connection member 12, and an outer contour of the first connection portion 121 is provided to be matched with an inner contour of the first sub-post 112. The second connection portion 122 is provided to protrude from the first connection member 12, and an outer contour of the second connection portion 122 is provided to be matched with an inner contour of the second sub-post 113. Alternatively, for other combinations, for example, the first connection portion 121 is provided to be recessed in the first connection member 12, and the second connection portion 122 is provided to protrude from the first connection, member 12, etc., which are not described herein again.

Further, an outer diameter of the first connection portion 121 gradually decreases from an end close to the second connection portion 122 to an end away from the second connection portion 122. As a result, a connection relationship between the first sub-post 112 and the second sub-post 113 is more reliable, and this reinforcing structure has an effect of preventing breakage.

In some embodiments, an outer diameter of the second connection portion 122 is constant. As a result, the first connection portion 121 is more stable, so that a connection between the first sub-post 112 and the second sub-post 113 is more reliable.

In some embodiments, when the first connection member portion 121 is provided to be recessed in the first connection member 12, and/or when the second connection portion 122 is provided to be recessed in the first connection member 12, an outer periphery of the first connection member portion 121 and/or the second connection portion 122 is provided with a reinforcing rib. The reinforcing rib is capable of reinforcing the connection between the first sub-post 112 and the second sub-post 113.

In some embodiments, two adjacent sub-posts are threadedly connected to the first connection member 12. The threaded connection is simple and convenient. Specifically, threaded holes can be formed in the two sub-posts, and then a matching bolt can be used for the fixed connection.

In a specific embodiment, an interior of the first connection member 12 is provided with a support portion 123. An end of the first sub-post 112 abuts against the support portion 123 after engaging with the recessed first connection portion 121. The lamp post 10 further includes a plurality of first bolts, and the first sub-post 112 is threadedly connected to the support portion 123 of the first connection member 12 through the first bolts.

An end of the second sub-post 113 abuts against the support portion 123 after engaging with the recessed second connection portion 122. The lamp post 10 further includes a plurality of second bolts, and the second sub-post 113 is threadedly connected to the support portion 123 of the first connection member 12 through the second bolts.

Further, an outer diameter of the first sub-post 112 is smaller than that of the second sub-post 113. The first connection member 12 is provided with a second threaded hole 124 through which the second bolt extends into the first connection portion 121 and the support portion 123. The second bolt is threadedly connected to the second threaded hole 124, so that the second sub-post 113 is connected to the support portion 123 of the first connection member 12. As a result, the lamp post 10 is more stable without affecting the mounting positions of the first bolt and the second bolt.

In some embodiments, the first connection member 12 may be a die cast, which is integrally formed and has a stable and high-strength structure.

Referring again to FIG. 3, in some embodiments, the lamp with integrated structure for lighting and energy storage 100 further includes a lifting ring 50. The lifting ring 50 includes an outer frame 51, an inner frame 52, and a plurality of support rods 53 connecting the outer frame 51 to the inner frame 52. The plurality of support rods 53 are arranged at intervals around a center of the lifting ring 50. The inner frame 52 is sleeved on the lamp post 10, and an upper end of the inner frame 52 abuts against the first connection member 12. As a result, when the lifting ring 50 is subjected to an upward lifting force, the second connection portion 122 of the first connection member 12 provides a resistance against an upward movement of the lifting ring 50.

In addition, since the lifting ring 50 is provided at the first connection member 12, and this position is convenient for operation and viewing, so that potted plants or string lights can be placed in an opening formed by two adjacent support rods 53 and the outer frame 51 and the inner frame 52 for decoration.

Specifically, the inner frame 52 is sleeved on the second sub-post 113, and the upper end of the inner frame 52 abuts on the second connection portion 122 of the first connection member 12.

Referring to FIGS. 1 and 2 again, in some embodiments, a side wall of the second sub-post 113 is provided with a mounting opening and a cover 114 covering the mounting opening. The mounting opening communicates with the receiving cavity 111. By opening the cover 114, it is very convenient to place the energy storage device 40 in the receiving cavity 111 and it is also convenient for subsequent maintenance.

In order to facilitate the placement and fixing of the energy storage device 40, two support plates may be provided in the receiving cavity 111 of the second sub-post 113 at intervals in the vertical direction. The energy storage device 40 is provided between the support plates.

In some embodiments, a lower end of the second sub-post 113 is further provided with a base 115. The base 115 is provided with a fixed through hole. The lower end of the second sub-post 113 is fixed in the fixed through hole. Specifically, the base 115 may be a flange.

In some embodiments, two clamping grooves extending in the vertical direction are oppositely disposed on a side wall of the first sub-post 112 at intervals, and two sides of the photovoltaic panel 30 are clamped in the two clamping grooves, respectively. In other embodiments, the photovoltaic panel 30 may be fixed by other means, such as by adhesive bonding, etc.

Figure 5:
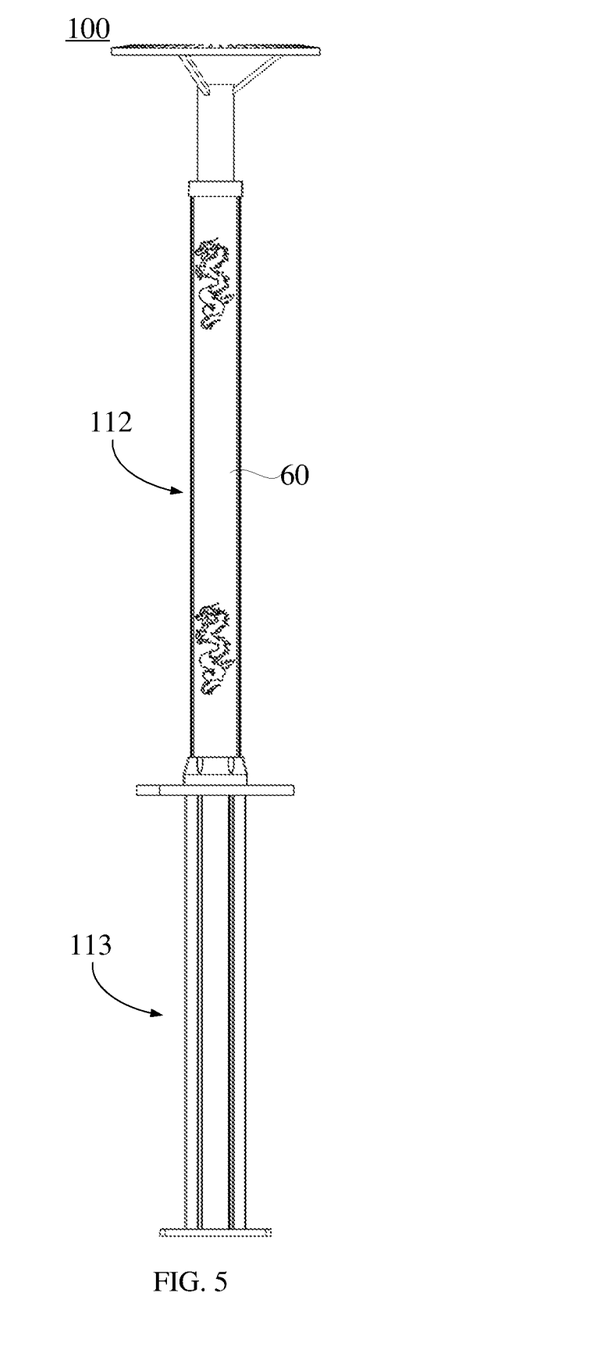
FIG. 5 is a schematic structural view of the lamp with integrated structure for lighting and energy storage shown in FIG. 1 from yet another viewing angle.

As shown in FIG. 5, in some embodiments, the lamp with integrated structure for lighting and energy storage 100 further includes a transparent and embossed lampshade 60 and a light bar (not shown in the figure). The transparent and embossed lampshade 60 and the light bar are both mounted on the side wall of the first sub-post 112, and the light bar is mounted on an edge of the transparent and embossed lampshade 60. It should be appreciated that, since the transparent and embossed lampshade 60 is transparent, the light bar can introduce light onto the transparent and embossed lampshade 60 through the edge of the transparent and embossed lampshade 60, so that the transparent and embossed lampshade 60 presents an embossed pattern. This arrangement makes the lamp with integrated structure for lighting and energy storage 100 more artistic. In other embodiments, the transparent and embossed lampshade 60 and the light bar may also be disposed on the second sub-post 113.

In other embodiments, the lamp with integrated structure for lighting and energy storage 100 further includes: a lampshade formed by the combination of a light guide plate, a lamp picture and a transparent housing; and a light bar. The lampshade and the light bar are both mounted on the side wall of the first sub-post 112, and the light bar is mounted on the edge of the transparent and embossed lampshade. It should be appreciated that the light bar can introduce the light into the lampshade through the edge of the lampshade, and the light guide plate guides the light to the lamp picture and the transparent housing, so that the lampshade presents the pattern of the lamp picture. This arrangement makes the lamp with integrated structure for lighting and energy storage 100 more artistic. In other embodiments, the lampshade and the light bar may also be disposed on the second sub-post 113.

Specifically, the transparent and embossed lampshade 60 or the transparent housing is made of an acrylic plate.

Referring to FIG. 2 again, in some embodiments, the lamp with integrated structure for lighting and energy storage 100 further includes a second connection member 70 through which the lamp 20 is detachably connected to the first sub-post 112.

Specifically, the second connection member 70 includes a connection cover plate 71 and a connection sleeve 72. The connection cover plate 71 is covered at a light inlet of the first sub-post 112 and is detachably connected to the first sub-post 112. The connection cover plate 71 is further provided with a through hole matched with an outer contour of the connection sleeve 72. The connection sleeve 72 extends through the connection cover plate 71 and the light inlet into a light passage of the first sub-post 112, and is detachably connected to the connection cover plate 71. The lamp 20 is sleeved on and detachably connected to an end of the connection sleeve 72 away from the first sub-post 112.

It will be appreciated that the light of the lamp 20 enters the light passage through an interior of the connection sleeve 72.

Further, the lamp 20 and the first sub-post 112 are threadedly connected to the second connection member 70.

Figure 6:
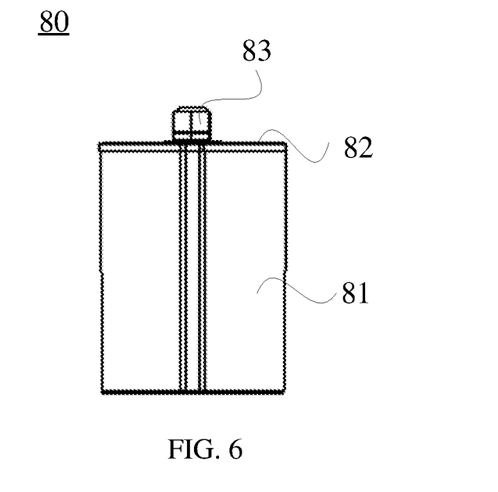
FIG. 6 is a schematic structural view of an insulating accommodating box of a lamp with integrated structure for lighting and energy storage in an embodiment of the present disclosure.

As shown in FIG. 6, in some embodiments, the energy storage device 40 further includes at least one supercapacitor module, and each supercapacitor module includes a plurality of supercapacitors connected to each other. Compared with lithium batteries and lead-acid batteries, a charge-discharge process of the supercapacitor is a physical energy storage without chemical reactions. Therefore, an electron transfer speed of the supercapacitor module is fast, and the charge-discharge process is fast. In addition, a heat generated by the supercapacitor module is extremely low, and the energy storage capacity of the supercapacitor module is stronger under low light conditions.

It should be noted that the plurality of supercapacitors connected to each other may be connected in series, which is not limited herein.

Further, the lamp with integrated structure for lighting and energy storage 100 further includes at least one insulating accommodating box 80 disposed in the receiving cavity 111, and each insulating accommodating box 80 accommodates a corresponding supercapacitor module. Since the lamp post 10 is generally made of metal materials, a short circuit may occur when the supercapacitor module is placed on the metal lamp post 10 without protection. Therefore, the insulating accommodating box 80 is provided to avoid the short circuit of the supercapacitor module, and to protect the supercapacitor module from being damaged caused by other external factors.

Specifically, the insulating accommodating box 80 includes a box body 81 having an opening on a side of the box body 81, and a cover body 82 covering at the opening. The cover body 82 is further provided with an electrode lead-out end 83 which leads out the positive and negative electrodes of the supercapacitor module. This arrangement is simple and is convenient for mounting the supercapacitor.

More specifically, the electrode lead-out end 83 on the cover body 82 is a cable gland.

In some embodiments, the insulating accommodating box 80 further includes a gasket disposed between the box body 81 and the cover body 82 for sealing the insulating accommodating box.

Figure 7:
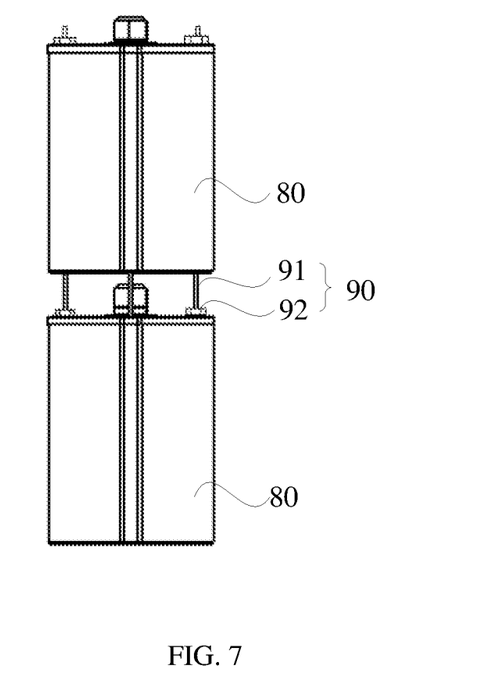
FIG. 7 is a schematic structural view of a plurality of insulating accommodating boxes which are stacked and connected, of a lamp with integrated structure for lighting and energy storage in an embodiment of the present disclosure.

Referring to FIGS. 6 and 7, In some embodiments, it is provided a plurality of supercapacitor modules and a plurality of insulating accommodating boxes 80. The plurality of insulating accommodating boxes 80 are provided to be stacked and connected to each other. The plurality of supercapacitor modules may enhance the storage capacity of the energy storage device 40. By using the plurality of insulating accommodating boxes 80, the space may be saved, and structures inside the lamp post 10 may be adapted.

It should also be pointed out that the plurality of supercapacitor modules are connected to each other, and the connection method can be a series connection or other connection methods, which can be set according to the requirements. In a specific embodiment, the lamp with integrated structure for lighting and energy storage 100 includes three supercapacitor modules, and each supercapacitor module includes four supercapacitors. Two of the four supercapacitors are connected in parallel, and the other two are connected in series.

Further, the lamp with integrated structure for lighting and energy storage 100 further includes a connection member 90 connected between two adjacent insulating accommodating boxes 80. The connection member 90 includes a plurality of screw rods 91 and a plurality of nuts 92 matched with the screw rods 91. The plurality of nuts 92 are fixed to the top of the insulating accommodating box 80, and each screw rod 91 extends through the plurality of insulating accommodating boxes 80 and the corresponding nuts 92, so that the plurality of insulating accommodating box 80 are stacked and connected to each other. This connection is simple, and the distance between two adjacent insulating accommodating boxes 80 may be controlled, so that the electrode lead-out end of each insulating accommodating box 80 is not affected by a stacking arrangement. Specifically, the nut 92 is fixed to the cover body 82 of the insulating accommodating box 80.

In a specific embodiment, it is provided four screw rod 91 that are respectively disposed at four diagonal corners of the insulating accommodating box 80 to stabilize the stacking.

The lamp with integrated structure for lighting and energy storage 100 of the present disclosure has the following advantages over the prior art:

(1) the lamp post 10 is disassembled into the plurality of sub-posts, the photovoltaic panel 30 may be mounted on the outer surface of the corresponding sub-post, and the energy storage device 40 is mounted in the receiving chamber 111 of the sub-post, so that the footprint required by the lamp with integrated structure for lighting and energy storage 100 in the transportation process is significantly reduced, and the transportation cost is saved;

(2) the first connection portion 121 is configured to cooperate with the end of the first sub-post 112 to limit the first sub-post in the radial direction, and the second connection portion 122 is configured to cooperate with the end of the second sub-post 113 to limit the second sub-post 133 in the radial direction, so that the first sub-post 112 and the second sub-post 113 is firmly connected by the first connection member 12, preventing an unstable connection at the connection position caused by the first sub-post 112 and the second sub-post 113 being too long or too thin;

(3) the outer diameter of the first connection portion 121 is provided to gradually decrease from the end close to the second connection portion 122 to the end away from the second connection portion 122, so that the connection relationship between the first sub-post 112 and the second sub-post 113 is more reliable, and this reinforcing structure has an effect of preventing breakage;

(4) the first connection member 12 is provided as a die cast, which is integrally formed and has a stable and high-strength structure;

(5) the light outlet is provided on the side wall of the first sub-post 112, the acrylic lampshade is covered on the light outlet, and the first sub-post 112 also has a light exit passage for guiding the light of the lamp 20 to the light outlet, so that the side wall of the lamp post 10 may emit light, which enhances the aesthetic feeling of the lamp with integrated structure for lighting and energy storage 100;

(6) it is provided the plurality of supercapacitor modules and the plurality of insulating accommodating boxes 80, the plurality of insulating accommodating boxes 80 are provided to be stacked and connected to each other, thereby enhancing the storage capacity of the energy storage device 40. In addition, by using the plurality of insulating accommodating boxes 80, the space may be saved, and the structures inside the lamp post 10 may be adapted.

Each of the technical features of the above-mentioned embodiments may be combined arbitrarily. To simplify the description, not all the possible combinations of each of the technical features in the above embodiments are described. However, all the combinations of these technical features should be considered as within the scope of this disclosure, as long as such combinations do not contradict with each other.

The above-mentioned embodiments are merely illustrative of several embodiments of the present disclosure, which are described specifically and in detail, but it cannot be understood to limit the scope of the present disclosure. It should be noted that, for those ordinary skilled in the art, several variations and improvements may be made without departing from the concept of the present disclosure, and all of which are within the protection scope of the present disclosure. Therefore, the protection scope of the present disclosure shall be defined by the appended claims.

What is claimed is:

1. A lamp with integrated structure for lighting and energy storage, the lamp comprising:
    a lamp post;
    lamp;
    at least a photovoltaic panel; and
    an energy storage device,
    wherein the lamp post comprises at least two sub-posts, and two adjacent sub-posts are detachably connected to each other,
    wherein the lamp is detachably mounted on a sub-post on a top of the lamp post,
    wherein an interior of one of the sub-posts is provided with a receiving cavity, the energy storage device is received in the receiving cavity,
    wherein the at least a photovoltaic panel is disposed on an outer surface of at least one of the sub-posts, and
    wherein the lamp post further comprises a first connection member through which two adjacent sub-posts are detachably connected, wherein the first connection member is sleeved on each of outer sides of the two adjacent sub-posts,
    wherein the first connection member is provided with a first connection portion and a second connection portion, which are opposite to each other and the first connection portion is configured to cooperate with an end of one sub-post to limit the sub-post in a radial direction, and the second connection portion is configured to cooperate with an end of another adjacent sub-post to limit the other adjacent sub-post in the radial direction; and
    wherein an outer diameter of the first connection portion gradually decreases from an end close to the second connection portion to an end away from the second connection portion.

2. The lamp of claim 1, wherein the first connection portion is provided to protrude from the first connection member, and an outer contour of the first connection portion is provided to be matched with a shape of an inner cavity of the corresponding sub-post; or
    the first connection portion is provided to be recessed in the first connection member, and an inner contour of the first connection portion is provided to be matched with an outer contour of the corresponding sub-post.

3. The lamp of claim 1, wherein the second connection portion is provided to protrude from the first connection member, and an outer contour of the second connection portion is provided to be matched with a shape of an inner cavity of the corresponding sub-post; or the second connection portion is provided to be recessed in the first connection member, and an inner contour of the second connection portion is provided to be matched with an outer contour of the corresponding sub-post.

4. The lamp of claim 3, wherein an outer diameter of the second connection portion is constant.

5. The lamp of claim 1, wherein the lamp with integrated structure for lighting and energy storage further comprises a transparent and embossed lampshade and a light bar, wherein the transparent and embossed lampshade and the light bar are both mounted on a side wall of the sub-post, and the light bar is mounted on an edge of the transparent and embossed lampshade; or the lamp with integrated structure for lighting and energy storage further comprises a lampshade formed by the combination of a light guide plate, a lamp picture and a transparent housing, and a light bar, wherein the lampshade and the light bar are both mounted on a side wall of the sub-post, and the light bar is mounted on an edge of the lampshade.

6. The lamp claim 1, wherein the energy storage device comprises at least a supercapacitor module, and each supercapacitor module comprises a plurality of supercapacitors connected to each other.

7. The lamp of claim 6, wherein the lamp with integrated structure for lighting and energy storage further comprises at least one insulating accommodating box disposed in the receiving cavity, wherein each insulating accommodating box accommodates a corresponding supercapacitor module.

8. The lamp of claim 7, wherein the insulating accommodating box comprises a box body having an opening on a side of the box body, and a cover body covering at the opening, and wherein the cover is further provided with an electrode lead-out end which leads out positive and negative electrodes of the supercapacitor module.

9. The lamp of claim 7, wherein it is provided a plurality of supercapacitor modules and a plurality of insulating accommodating boxes, the plurality of insulating accommodating boxes is provided to be stacked and connected to each other.

10. The lamp storage of claim 9, wherein the lamp with integrated structure for lighting and energy storage further comprises a connection member connected between two adjacent insulating accommodating boxes, the connection member comprises a plurality of screw rods and a plurality of nuts matched with the screw rods, the plurality of nuts is fixed to a cover body of the insulating accommodating box, and each screw rod extends through the plurality of insulating accommodating boxes and the corresponding nuts, so that the plurality of insulating accommodating box are stacked and connected to each other.

* * * * *